(12) United States Patent
Neale et al.

(10) Patent No.: US 12,480,407 B2
(45) Date of Patent: Nov. 25, 2025

(54) GAS TURBINE ENGINE COMPONENT WITH VARIABLE COOLING HOLE GEOMETRY

(71) Applicant: ROLLS-ROYCE plc, London (GB)

(72) Inventors: Christopher Neale, Bristol (GB); James R. Kingsley-Rowe, Bath (GB)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 18/746,279

(22) Filed: Jun. 18, 2024

(65) Prior Publication Data

US 2025/0012194 A1   Jan. 9, 2025

(30) Foreign Application Priority Data

Jul. 4, 2023   (GB) ..................................... 2310234

(51) Int. Cl.
F01D 5/18 (2006.01)

(52) U.S. Cl.
CPC ........ F01D 5/187 (2013.01); *F05D 2260/201* (2013.01)

(58) Field of Classification Search
CPC . F01D 4/18; F01D 4/186; F01D 4/187; F05D 2260/201
See application file for complete search history.

(56) References Cited

U.S. PATENT DOCUMENTS

| | | |
|---|---|---|
| 8,545,180 B1 | 10/2013 | Liang |
| 9,719,358 B2 | 8/2017 | Neale et al. |
| 10,738,619 B2 | 8/2020 | Thornton et al. |
| 11,143,037 B1 | 10/2021 | Schneider et al. |
| 2009/0317258 A1* | 12/2009 | Tibbott ................... F01D 5/187 416/97 R |
| 2010/0129213 A1 | 5/2010 | Strohl et al. |
| 2013/0280091 A1 | 10/2013 | Propheter-Hinckley et al. |
| 2014/0193273 A1 | 7/2014 | Bommanakatte et al. |
| 2015/0044029 A1* | 2/2015 | Tibbott ................... F01D 5/187 415/115 |
| 2015/0226069 A1 | 8/2015 | Pearson et al. |
| 2016/0076383 A1 | 3/2016 | Spangler et al. |
| 2016/0169005 A1 | 6/2016 | Quach et al. |
| 2016/0230564 A1 | 8/2016 | Mongillo, Jr. et al. |
| 2016/0341049 A1* | 11/2016 | Neale ...................... F01D 5/186 |
| 2019/0316472 A1* | 10/2019 | Xu .......................... F01D 9/041 |

(Continued)

FOREIGN PATENT DOCUMENTS

| | | |
|---|---|---|
| EP | 1655453 A1 | 5/2006 |
| EP | 2835501 A1 | 2/2015 |

OTHER PUBLICATIONS

European search report dated Nov. 29, 2024, issued in EP Patent Application No. 24179758.8.

(Continued)

*Primary Examiner* — Nathaniel E Wiehe
*Assistant Examiner* — Jackson N Gillenwaters

(57) ABSTRACT

A gas turbine engine component that has a web provided with an array of cooling holes distributed with respect to a first direction, wherein the cooling holes have a cross-sectional shape that varies along the first direction. The component may be configured so that the first direction corresponds to a loading distribution of the component which increases along the first direction from a low loading position to a high loading position.

20 Claims, 7 Drawing Sheets

(56) References Cited

U.S. PATENT DOCUMENTS

2020/0141271 A1   5/2020  Waite et al.
2020/0191397 A1*  6/2020  Tentorio .................... F23R 3/60
2020/0224875 A1*  7/2020  Murray ................... F23R 3/002

OTHER PUBLICATIONS

Zhou et al, "Effects of film cooling hole locations on flow and heat transfer characteristics of impingement/effusion cooling at turbine blade leading edge," International Journal of Heat and Mass Transfer 126 (2018) 192-205, Jun. 14, 2018, Elsevier.

Xie et al, "Effect of leading edge diameter ratio and mainstream Reynolds number on film cooling performance of rotating blade leading edge," Applied Thermal Engineering 186 (2021) 116047, Oct. 4, 2020, Elsevier.

Meng et al, "Film cooling performance on pressure side of turbine blade with different number of hole rows under rotating state," Aerospace Science and Technology 126 (2022) 107569, Apr. 19, 2022, Elsevier.

Zhou et al, "Influences of effusion hole diameter on impingement/effusion cooling performance at turbine blade leading edge," International Journal of Heat and Mass Transfer 134 (2019) 1101-1118, Feb. 20, 2019, Elsevier.

Great Britain search report dated Dec. 4, 2023, issued in GB Patent Application No. 2310234.6.

Xie et al, "Hole arrangement effect to film cooling performance on leading edge region of rotating blade," International Journal of Thermal Sciences 169 (2021) 107034, Jun. 2, 2021, Elsevier.

\* cited by examiner

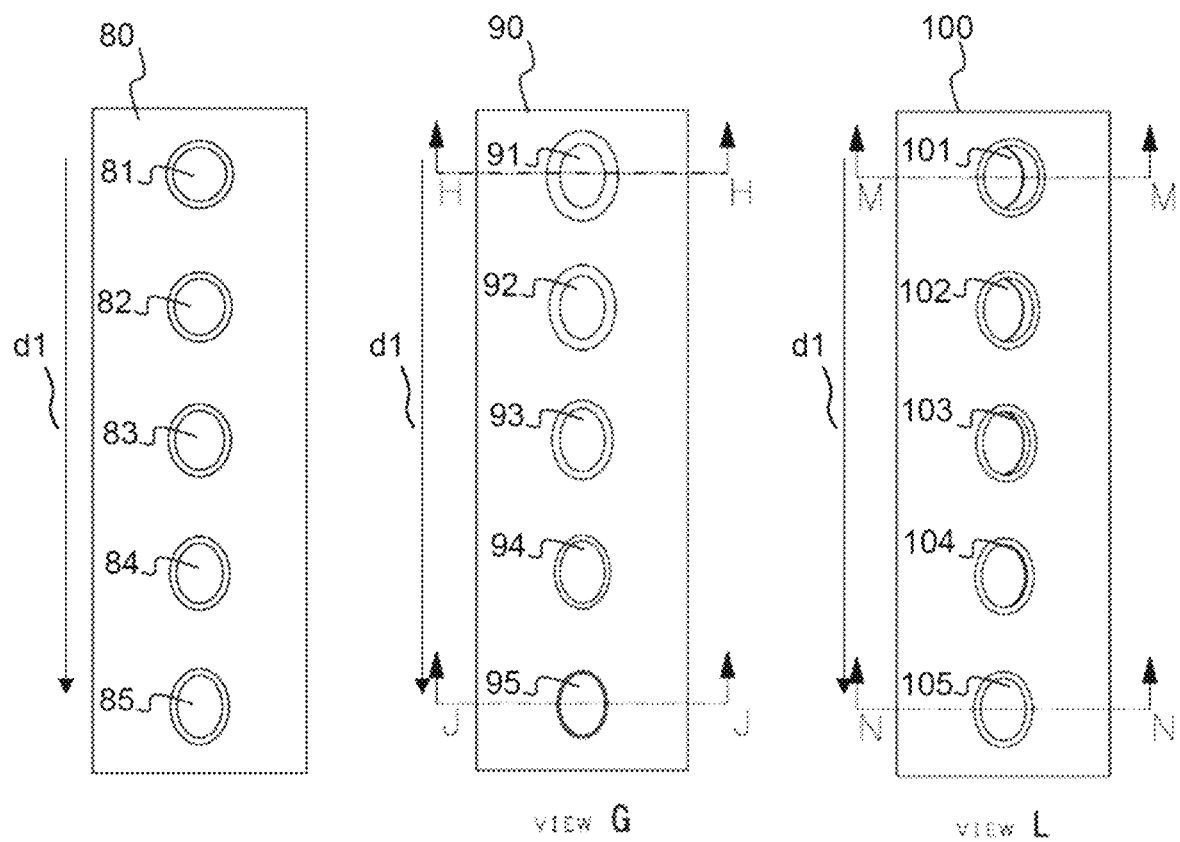
Fig. 8
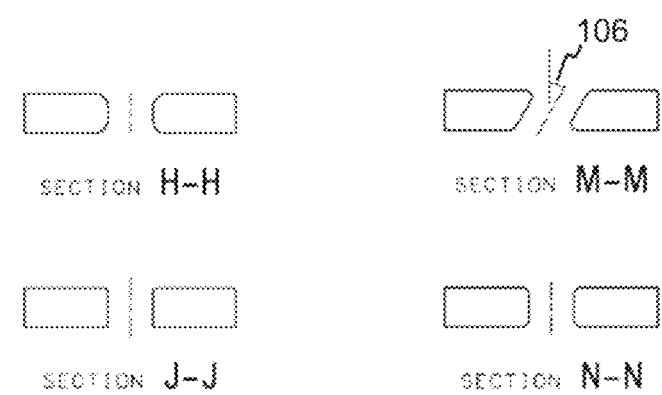
Fig. 9
Fig. 10

GAS TURBINE ENGINE COMPONENT WITH VARIABLE COOLING HOLE GEOMETRY

CROSS-REFERENCE TO RELATED APPLICATIONS

This specification is based upon and claims the benefit of priority from United Kingdom patent application GB 2310234.6 filed on Jul. 4, 2023, the entire content of which is incorporated herein by reference.

BACKGROUND

Technical Field

The present disclosure relates to a gas turbine engine component provided with cooling holes, such as a turbine blade, turbine vane or combustor liner.

Description of the Related Art

It is known to provide gas turbine engine components, such as a turbine blade, turbine vane, or combustor liner, with cooling holes to avoid such components reaching excessive temperatures in use. There are at two principal types of cooling holes: film cooling holes and transfer cooling holes. Film cooling holes are typically provided to extend through the outer wall of a component which is exposed to a hot gas path through the engine core, to provide a surface layer of a cooling gas over the outer gas-washed surface of the component. Transfer cooling holes are provided in a web of the component, for example an internal wall bridging a cavity. Transfer cooling holes may be provided to permit a cooling gas to move between compartments for respective cooling flows, and/or to impinge on a wall of the respective component which is to be cooled. It is known to provide transfer cooling holes in an array of regularly-spaced holes.

U.S. Pat. No. 9,719,358 B2 discloses arrangements for cooling holes in which one or more rows, including arrangements in which adjacent cooling holes are suitable for forming with a dual-pedestal core pedestal, to reduce bending loading on the respective pedestal, thereby improving reliability of manufacture.

SUMMARY

According to a first aspect there is provided a gas turbine engine component comprising a web provided with an array of cooling holes distributed with respect to a first direction, wherein the cooling holes have a cross-sectional shape that varies along the first direction.

It may be that the gas turbine engine component is configured so that the first direction corresponds to a loading distribution of the component which increases along the first direction from a low loading position to a high loading position.

One or more properties of the cooling holes may also vary along the first direction, selected from the group consisting of: an edge fillet radius; an edge chamfer length on a face of the web; an offset angle between a hole axis along which the hole extends and a normal axis which is locally normal to a face of the web; an aspect ratio of the cooling hole; and a relative thickness of any hole reinforcement features projecting from one or more respective faces of the web around the cooling hole, relative to the local web thickness.

It may be that one or more properties of the cooling holes varies along the first direction, selected from the group consisting of: an edge fillet radius which decreases along the first direction; an edge chamfer length on a face of the web, which decreases along the first direction; an offset angle between a hole axis along which the hole extends and a normal axis which is normal to a face of the web, the offset angle reducing along the first direction; an aspect ratio of the cooling hole, which diverges from unity along the first direction; and a relative thickness of any hole reinforcement features projecting from one or more respective faces of the web around the cooling hole, relative to the local web thickness, the relative thickness increasing along the first direction.

It may be that the gas turbine engine component is a turbine blade configured to be rotatably mounted in a gas turbine engine to extend along a radial axis, and wherein the first direction is a radially inward direction.

A loading distribution of the turbine blade may increase along the first direction (i.e. radially inward) because centripetal loads are higher towards a root than a tip of a rotating blade.

The gas turbine engine component may be a vane of a turbine stage, or a liner segment for a combustor.

It may be that the web forms an internal wall within the component.

It may be that the gas turbine engine component comprises an impingement cavity delimited by wall of the component and the web, wherein the web is configured to convey a cooling flow through the array of cooling holes to impinge on the wall within the impingement cavity.

It may be that the gas turbine engine component comprises two cavities partitioned by the web.

It may be that the one or more properties of the cooling holes which varies along the first direction include: the relative thickness of any hole reinforcement features projecting from one or more respective faces of the web around the cooling hole, relative to the local web thickness; and the offset angle between the hole axis along which the hole extends and the normal axis which is normal to a face of the web; wherein along the first direction, the relative thickness of any hole reinforcement features increases as the offset angle increases, or the relative thickness of any hole reinforcement features decreases as the offset and decreases.

Increasing relative thickness is associated with reducing local stress, whereas increasing an offset angle is associated with increasing local stress. Accordingly, the variations in the relative thickness may offset an increased local stress associated with the increased offset angle.

It may be that for each of the one or more properties of the cooling hole which varies along the first direction: the property monotonically increases or decreases along a series of at least three adjacent cooling holes within the array, wherein the cooling holes are adjacent to each other with respect to the first direction.

The property may monotonically increase or decrease along a series of at least four, at least five or at least six adjacent cooling holes.

According to a second aspect there is disclosed a gas turbine engine comprising a gas turbine engine component in accordance with the first or second aspects.

According to a third aspect there is disclosed an aircraft comprising the gas turbine engine according to the third aspect.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only by the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

DESCRIPTION OF THE DRAWINGS

Embodiments will now be described by way of example only with reference to the accompanying drawings, which are purely schematic and not to scale, and in which:

FIG. 8 is a schematic front view of cooling hole openings within an array of cooling holes, having varying aspect ratio along a first direction;

FIG. 9 is a schematic front view of cooling hole openings within an array of cooling holes, having varying fillet radii along a first direction, together with example cross-sectional views intersecting two holes;

FIG. 10 is a schematic front view of cooling hole openings within an array of cooling holes, having varying offset angles along a first direction, together with example cross-sectional views intersecting two holes;

DETAILED DESCRIPTION

Aspects and embodiments of the present disclosure will now be discussed with reference to the accompanying figures. Further aspects and embodiments will be apparent to those skilled in the art.

Figure 1:
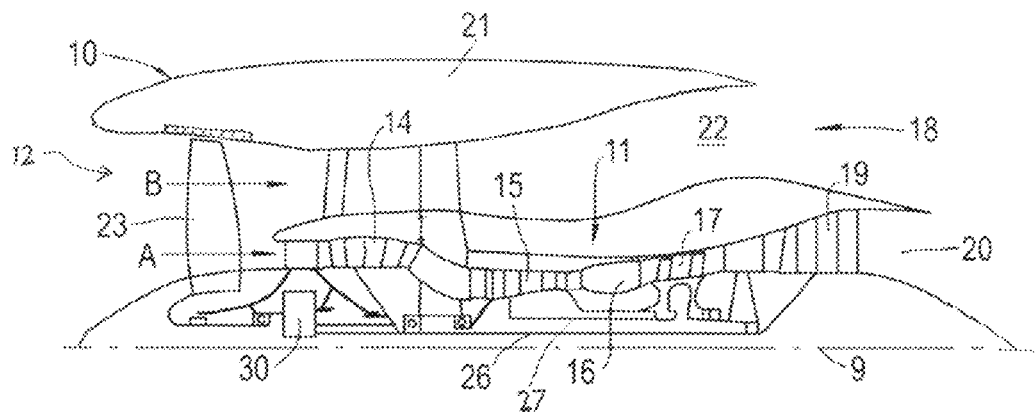
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
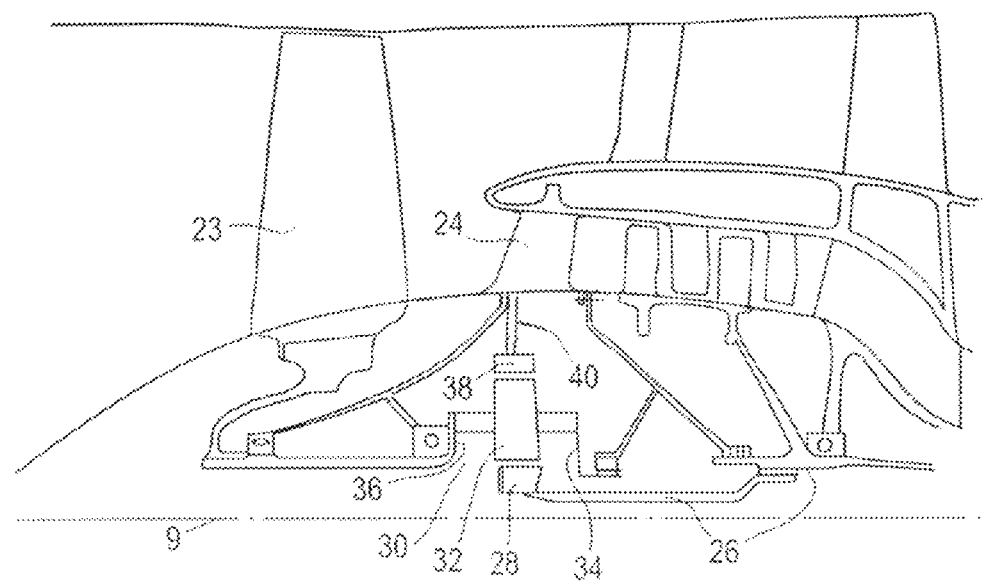
FIG. 2 is a close up sectional side view of an upstream portion of the gas turbine engine of FIG. 1.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
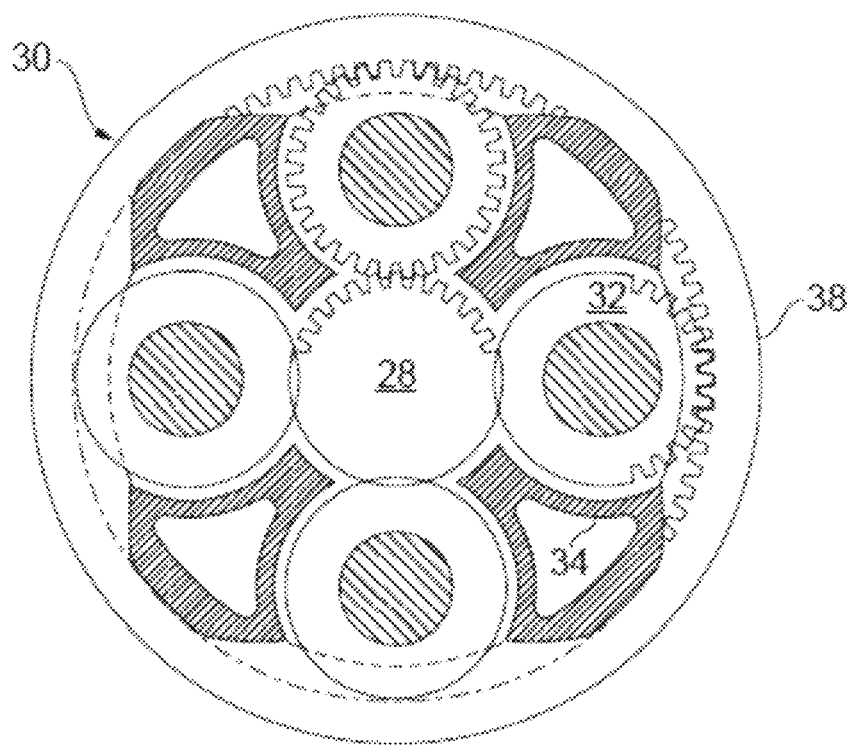
FIG. 3 is a partially cut-away view of the gearbox of the gas turbine engine of FIGS. 1 and 2.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the embodiment. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations. Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
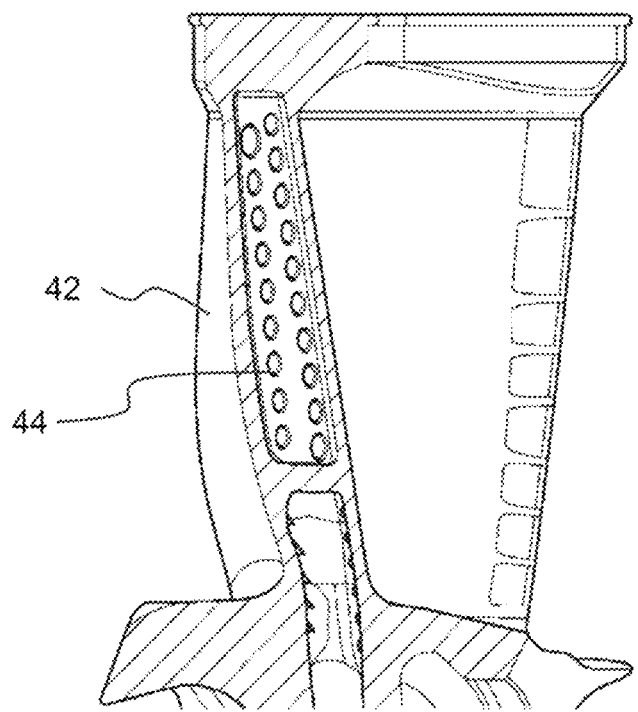
FIG. 4 is a cross-sectional cut-away view of a turbine blade body including a leading edge through which cooling channels can be provided.

FIG. 4 shows a turbine blade 42 provided with an array of cooling holes 44. As described in U.S. Pat. No. 9,719,358, such cooling holes may be provided by way of a casting procedure in which a core is suspended within a mould with pedestals to form the array of cooling holes, the mould defining the external geometry of the blade such that the blade body is formed between the mould and the core. The cooling holes shown in FIG. 4 are provided at a leading edge surface of the blade, and may be representative of either film cooling holes or transfer cooling holes as referenced herein. A gas turbine engine component such as the turbine blade 42 may have an internal web comprising transfer cooling holes, as will be described further below with respect to FIGS. 7a and 7b.

Gas turbine engine components may be subject to loading, whether in a shutdown state (which may be referred to as static support loading), or in use when subject to loads arising from operation of the engine, such as loads arising from thermal expansion, vibration, dynamic maneuvering, and rotation of engine components (such as turbine blade rotation).

Cooling holes are provided for gas turbine engine components which are subject to elevated temperatures with a core flow through the engine, and may experience significant aerodynamic loading, structural loading (e.g. static support loads, vibration loads and/or loads arising from thermal expansion effects) and rotational loading (e.g. stress arising from centripetal forces caused by rotation of the respective component).

Loading of a gas turbine engine component causes stress in the component, which may be concentrated at features such as cooling holes. Stress concentration within a stress field local to a cooling hole is a function of one or more geometric parameters relating to the cooling hole, such as a fillet radius at an edge of a cooling hole (i.e. where it meets a face of a web in which it is provided).

Figure 5:
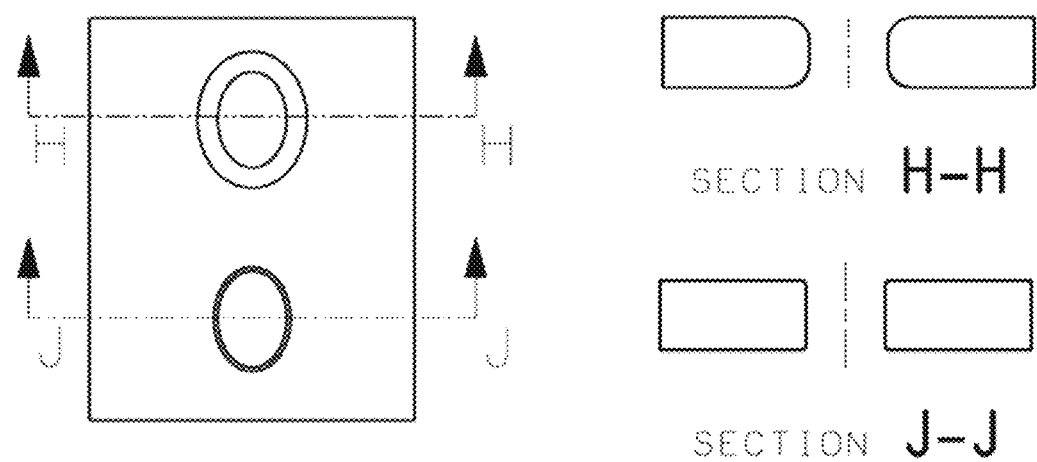
FIG. 5 is a schematic front view of cooling hole openings within an array of cooling holes, having different fillet radii, together with corresponding sectional views.

For example, as shown in FIG. 5 with respect to section H-H, a relatively larger fillet radius reduces a load-bearing cross-section through the length of the hole, relative to a relatively smaller fillet radius (as shown with respect to section J-J). The relatively smaller load-bearing cross section increases a stress concentration within the hole.

Figure 6:
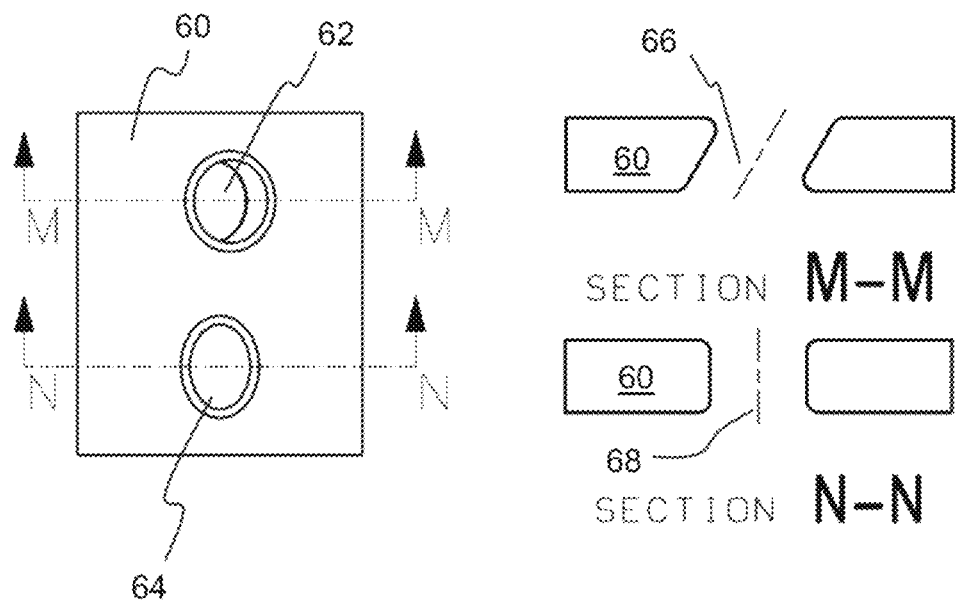
FIG. 6 is a schematic front view of cooling hole openings within an array of cooling holes, having different offset angles (as defined herein), together with corresponding sectional views.

As a further example, FIG. 6 shows an example web 60 provided with two holes 62, 64 extending through the web at different angles. In particular, as shown with respect to sections M-M and N-N, a first hole 66 extends at an angle offset with respect to a normal direction 68 through the web 60, whereas the second hole 68 extends through the web. Holes extending along non-normal directions may form acute angles (as shown in the left hand portion of the web delimiting the hole in the section M-M, with the acute angle towards the upper right vertex as drawn) and resulting stress concentrations.

While it may be desirable to reduce a fillet radius or use web-normal cooling holes for the reasons presented above, the present disclosure envisages variable use of such features within an array, to correspond with a local demand or loading requirement.

For example, a relatively low fillet radius may tend to reduce stress concentrations at the cooling hole, it is associated with manufacturing difficulties. For example, a relatively small fillet radius is more likely to lead to local recrystallisation during casting or heat treatment, thereby introducing local strength defects into the component. As technical background, it is known to form some gas turbine engine components to limit grain boundaries within the component, for example to form a turbine blade with no grain boundaries by controlled casting. Further, a relatively small fillet radius is more likely to lead to ceramic core breakage, owing to stress concentrations in a pedestal having a corresponding geometry (e.g. a small-radius feature corresponding to the small fillet radius at the cooling hole edge). It may also be technically complex to reliably form a relatively small fillet radius on a core element for a casting process (e.g., on a pedestal of the core element, or at the junction between the pedestal and a core body). The same comments apply equally to a chamfer (as opposed to a fillet), with a relatively short edge chamfer length on a face of the web (where the hole opens at the face of the web) being associated with the same challenges discussed above with respect to a relatively small edge fillet radius.

Figures 7A, 7B:
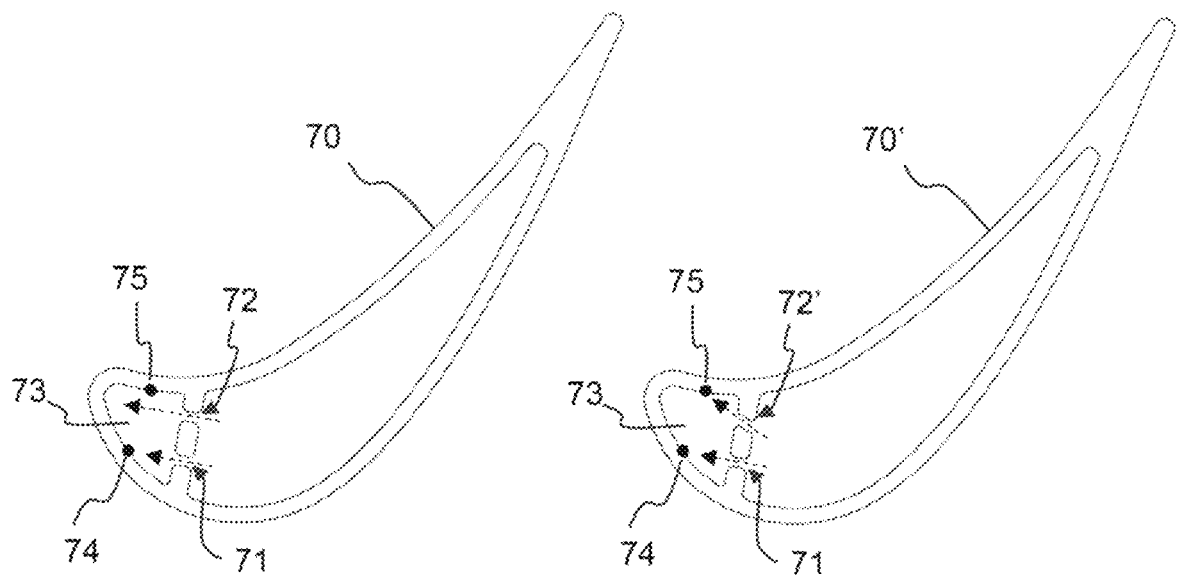
FIG. 7a is a schematic cross-sectional view of an aerofoil showing a configuration of cooling holes in a web between suction and pressure sides of the aerofoil.
FIG. 7b is a schematic cross-sectional view of an aerofoil showing a configuration of cooling holes in a web between suction and pressure sides of the aerofoil.

As a further example, a web-normal cooling hole (i.e. a cooling hole extending along a direction normal to the local plane of the web) may provide relatively poor flow transfer or impingement cooling effects, depending on the local geometry. FIGS. 7a and 7b schematically show a cross-section of two example aerofoils (which in this example are turbine vanes, but may be any suitable aerofoil, such as a turbine blade (rotor)) having a web partitioning two flow chambers. In the first example turbine vane 70 of FIG. 7a, two web-normal cooling holes 71, 72 are provided to direct impingement flows into a leading edge chamber 73. As illustrated, the first web-normal cooling hole 71 directs the respective impingement flow towards a respective cooling target location 74, whereas the second web-normal cooling hole 72 directs the respective impingement flow along a direction which bypasses a respective cooling target location 75. In contrast, in the example turbine vane 70' of FIG. 7b, the second web-normal cooling hole 72' of a corresponding web is angularly offset from the web-normal direction to direct the respective impingement flow towards the cooling target location 75.

The present disclosure envisages cooling hole arrays in which one or more geometric parameters vary between cooling holes of the array, to provide a local performance effect associated with the geometric parameter despite a penalty, such as a stress concentration, weight penalty or an association with manufacturing difficulty.

While it is known to provide a regular array of cooling holes having uniform geometric parameters, the provision of an array of cooling holes with variation in such geometric parameters permits local performance advantages to be realised, while limiting the any associated disadvantages to the cooling holes where the trade-off may be warranted.

A variation in such geometric parameters may correspond to a loading distribution to which the component is subject, for example in use in operation of the gas turbine engine. As only one example, a turbine blade is configured to be rotationally mounted within a gas turbine engine, such that it is subject to centripetal loading in use. Stress from centripetal loading is higher towards the blade root than the tip, because the magnitude of the load at any radial location depends on the mass of material at relatively radially-outward locations. Accordingly, in a turbine blade there is a direction of increasing loading along a first direction from a tip to a root of the blade. Other example components, such as a combustor liner and a turbine vane, may be subject to other local loading distributions which increase along respective directions.

Continuing the example of a turbine blade and increasing loading along a first direction which is radially inward, FIGS. 8-11 show example arrays of cooling holes (e.g. transfer cooling holes) provided in example variants of a web 80, 90, 100, 110 for the turbine blade. In each example, a first direction d1 of increasing loading is shown, which in this example is a radially inward direction. While the first direction d1 corresponds to the elongate extent of the example arrays of cooling holes, it should be appreciated that the cooling holes may be elongately arranged along a different direction, provided that they are distributed with respect to the first direction. For example, an array of cooling holes may be arranged to form a line extending along a direction which is angularly inclined relative to the first direction, but which has an extent along the first direction such that the cooling holes are distributed with respect to the first direction.

FIG. 8 shows part of an example web 80 comprising an array of cooling holes 81-85 distributed along the web with respect to the first direction d1. As shown in FIG. 8, an aspect ratio of the cooling holes diverges from unity (1) along the first direction d1. The expression "diverges from unity" indicates that the aspect ratio is either increasing or decreasing so as to move further from 1, and as such does not depend on the precise definition of the aspect ratio. For example, if the aspect ratio is defined as width/height it will be a reciprocal of an alternative definition of the aspect ratio defined as height/width.

Figure 13:
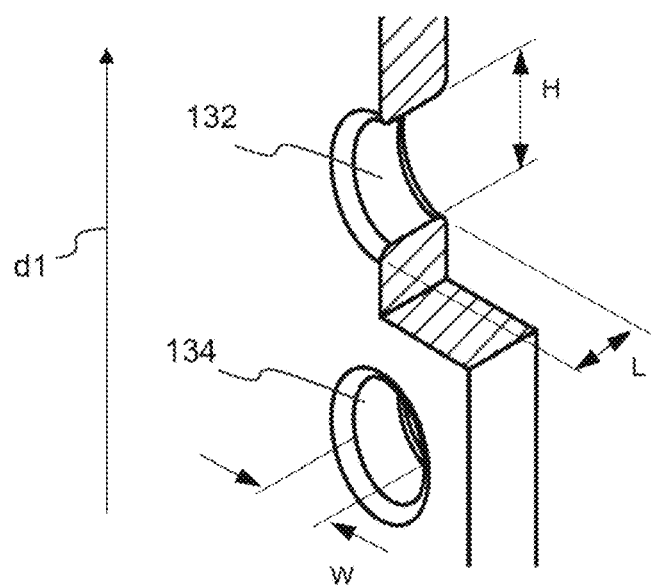
FIG. 13 illustrates length, width and height dimensions for cooling holes.

In this example, the first direction corresponds to a centripetal loading distribution (e.g. radial loads are the dominant load in use), and the inventors have determined that a higher aspect ratio provided by a larger hole height H than hole width W tends to locally reduce stress concentrations, but is associated with manufacturing challenges (a width W, height H and length L of example holes are shown in FIG. 13, discussed below). This reflects generally accepted stress concentration theory for ellipses, whereby a slender aspect ratio with respect to a loading direction reduces stress concentrations. This corresponds to slender aspect ratio holes minimising an interruption of the stress field along the loading direction. In particular, for the same flow area one of the dimensions is lower (in this example, the width W), which tends to make the pedestal for forming the hole weaker and more prone to breaking. Accordingly, the aspect ratio diverges from 1 along the first direction d1, such that although the holes closer to the root may be associated with greater manufacturing challenges, there is a trade-off of reduced stress concentration effects in the region under highest loading (e.g. highest centripetal loading). In contrast, towards the tip there is less loading and it becomes commensurately less important to reduce local stress concentration effects, which permits an aspect ratio closer to 1 to be used.

Although the above example has been described with respect to high aspect ratio holes in which the longer dimension is the height and the shorter dimension is the width, in other examples other permutations of height, width and length as the longer and shorter dimensions may be appropriate.

Referring briefly to FIG. 13, a notation convention is shown for example cooling holes 132, 134. Upper cooling hole 132 is shown in a perspective view with a cutaway intersecting the hole, whereas lower cooling hole 134 is shown without a cutaway. The length L of the hole is thickness through the web. The height H and width W dimensions correspond to planes through a central axis of the hole. A height H and a width W may be determined and defined by reference to a frame of reference. In the example of FIG. 13, the first direction d1 corresponds to a radial direction, with the height H being aligned with the radial direction, and the width W being orthogonal to the radial direction. However, in other examples a height and a width may be defined with respect to different local directions (e.g. based on local geometric features, or directions of a loading distribution).

Figure 12:
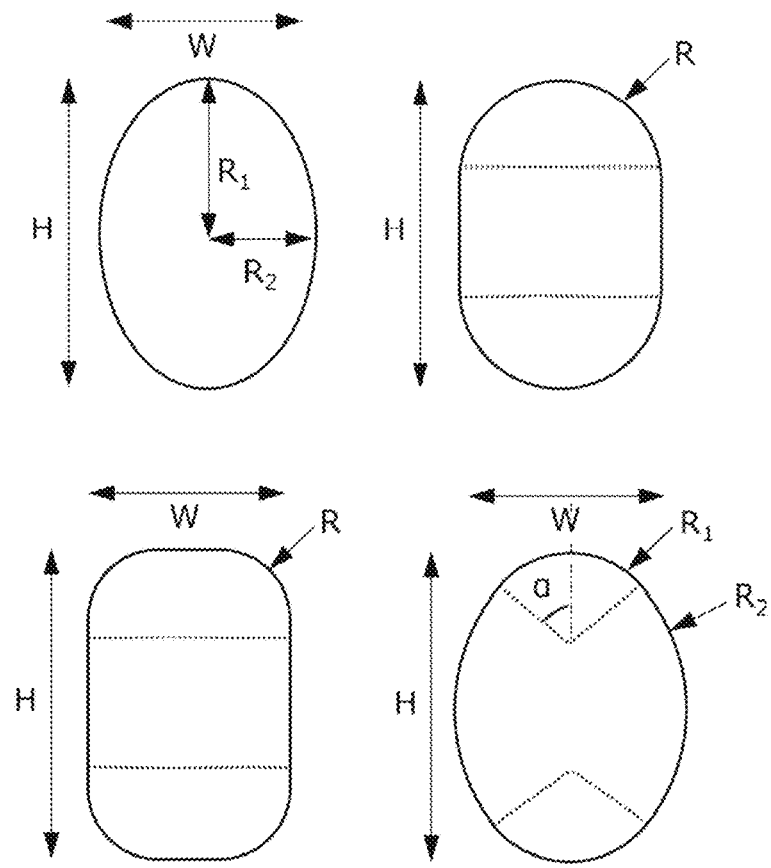
FIG. 12 shows four example cross-sectional shapes for cooling holes.

Yet further, an aspect ratio may be varied while retaining cross-sectional flow area of a hole by varying a hole shape. Briefly referring to FIG. 12, four example cross-sections are shown, including an ellipse, a "racetrack" with arcuate ends, a "racetrack" with four arcuate corners, and an oval. Arcs are indicated by dimension arrows R, R1 or R2. Each shape has a respective height H and width W.

FIG. 9 shows part of an example web 90 comprising an array of cooling holes 91-95 distributed along the web with respect to the first direction d1. As shown in FIG. 9, an edge fillet radius of the cooling holes varies along the first direction d1, from a relatively large fillet radius to a relatively small fillet radius. Instead of an edge fillet radius, an edge chamfer length on a face of the web (e.g. at a hole opening onto the face of the web) may vary from a relatively large edge chamfer length to a relatively small edge chamfer length.

As discussed above with respect to FIG. 5, the inventors have determined that a relatively lower edge fillet radius (or edge chamfer length) tends to locally reduce stress concentrations, but is associated with manufacturing challenges. In particular, as described above with respect to FIG. 5, such manufacturing challenges are associated with structural integrity of an associated core element (e.g. a pedestal) for forming the respective hole and edge fillet/edge chamfer. Accordingly, the dimension of the edge fillet radius (or edge chamfer length) reduces along the first direction d1, such that although the holes closer to the root may be associated with greater manufacturing challenges, there is a trade-off of reduced stress concentration effects in the region under highest loading (e.g. highest centripetal loading). In contrast, towards the tip there is less loading and it becomes commensurately less important to reduce local stress concentration effects, which permits a relatively larger edge fillet radius to be used.

Although FIG. 9 appears to show a uniform edge fillet radius or edge chamfer length around each hole, the present disclosure envisages the respective dimension varying around the azimuth of the cooling hole. For example, in an angular frame of reference at a cooling hole edge, such that 0° corresponds to the radially-outermost location and 180° corresponds to the radially innermost location around the edge, the dimension of the edge fillet or edge chamfer may be relatively large at the 0° and 180° positions, and relatively small at the 90° and 270° positions. Given this variability, the concept discussed above that the size of an edge fillet or edge chamfer may vary between cooling holes of the array should be determined (e.g. measured) at the same azimuthal location at each hole (e.g., comparing the edge fillet radius between multiple holes at the same location, such as the 0° location for each hole).

FIG. 10 shows part of an example web 100 comprising an array of cooling holes 101-105 distributed along the web with respect to the first direction d1. As shown in FIG. 9, an offset angle 106 (as defined above with reference to FIG. 6) varies between the holes along the first direction d1, from a relatively large offset angle to a relatively small offset angle. As discussed above with respect to FIG. 5, the inventors have determined that an increasing offset angle tends to increase stress concentrations. Accordingly, in view of the increasing loading along the direction d1, in this example the offset angle reduces along the first direction d1, such that the reduced offset angle may at least partially offset increasing stress along the first direction d1.

The example of FIG. 10 illustrates an example web design for which it may be optimal for cooling purposes to provide the cooling holes at a non-zero offset angle (e.g. to control an impingement flow to impinge on a target cooling location on a wall of the respective component). The example trend of reducing the offset angle along the direction d1 may therefore correspond to diverting the cooling holes away from a more optimal angle for cooling, in order to reduce stress concentration effects along the direction d1, given the prevailing loading of the component. Viewed from another perspective, this configuration reflects a trade-off between configuring a cooling hole to reduce stress concentrations in regions where there is elevated loading (e.g. further along the first direction d1), with a trade-off with another characteristic associated with the hole. In the example of FIG. 10, the trade-off characteristic is the cooling angle no longer being aligned with an optimal angle, whereas in the examples of FIGS. 8 and 9, a trade-off characteristic is the reduced reliability of manufacture (associated with the small edge fillet radius or edge chamfer length, and the aspect ratio diverging from 1).

Figures 11A, 11B, 11C, 11D:
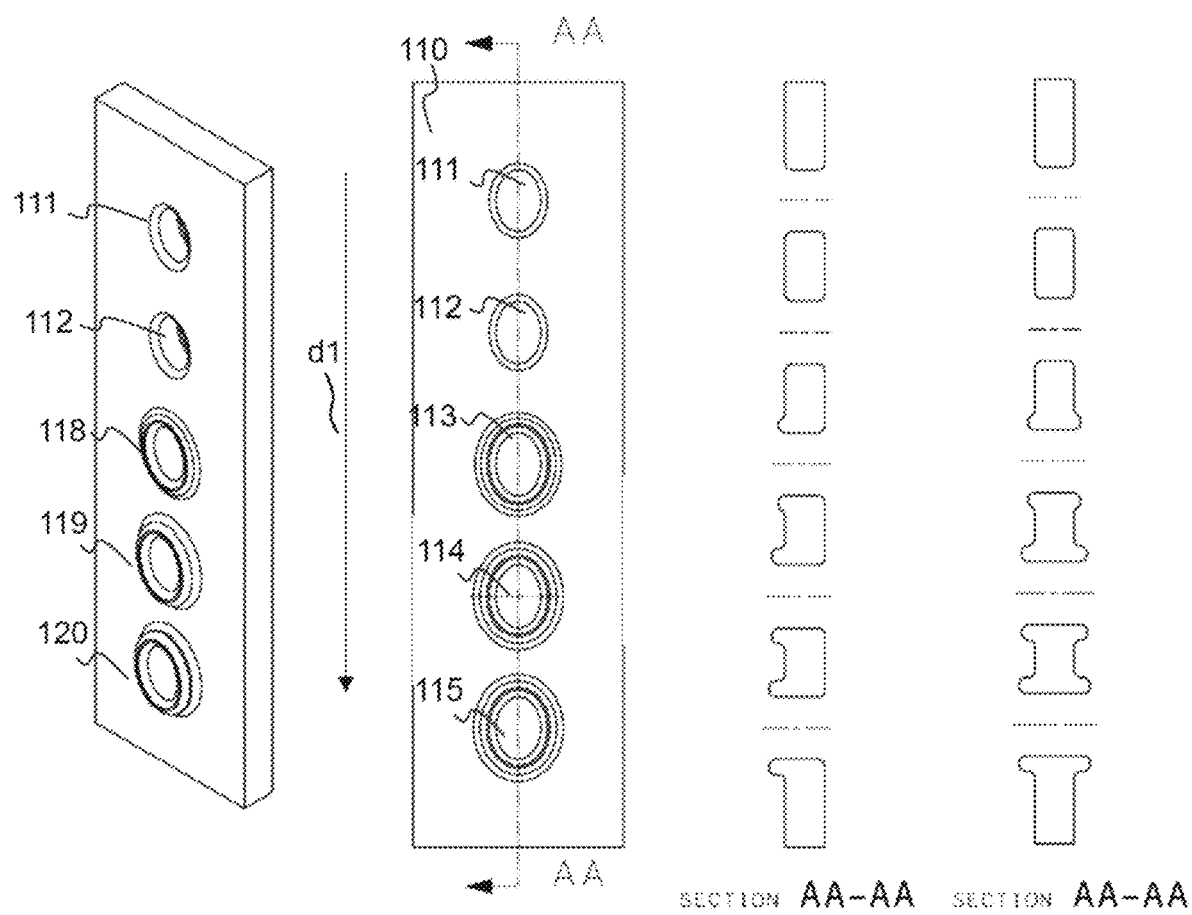
FIG. 11a is a perspective view of an array of cooling holes with variable relative thicknesses of hole reinforcement features.
FIG. 11b is a front view of an array of cooling holes with variable relative thicknesses of hole reinforcement features.
FIG. 11c is a side-sectional view of an array of cooling holes with variable relative thicknesses of hole reinforcement features.
FIG. 11d is a side-sectional view of a variant example of the array.

FIGS. 11a-11c show three views of part of a web 110 comprising an array of cooling holes 111-115 distributed along the web with respect to the first direction d1, with FIG. 11a showing a perspective view, FIG. 11b showing a front view onto a face of the web, and FIG. 11c showing a side-sectional view. As shown in FIGS. 11a-11c, a dimension of a hole reinforcement feature 118, 119, 120 around the edge of the holes varies along the first direction d1. In this example, the hole reinforcement features are provided on the three holes furthest along the first direction d1, with a relative thickness which increases along the first direction d1 (relative to an underlying thickness of the web as determined by reference to the surrounding profile of the web). The inventors have determined that the provision of the hole reinforcement feature reduces local stress concentrations at the respective hole, with an increasing relative thickness further reducing local stress concentrations. As shown in FIG. 11c, in this example the hole reinforcement feature is provided on one face of the web, but in a variant example shown in FIG. 11d the hole reinforcement feature may be provided on both faces of the web. There may be advantages associated with both configurations. In particular, by providing hole reinforcement features on both sides, more material can be added proximal to the web to have a stress-reducing effect. On the other hand, there may be advantages in terms of flow distribution and guiding effects of avoiding hole reinforcement features on one side of a web, for example on an upstream side with respect to a prevailing direction of flow through the respective holes. Such features may otherwise inhibit flow turning into respective holes, particularly in narrow chambers. When provided on both sides, the relative thickness of the feature (on both sides) is assessed as the total of additional thickness on both sides, relative to the underlying thickness of the web.

Similarly to the other geometric parameters discussed herein, the present disclosure envisages increasing the relative thickness of any hole reinforcement feature to reduce stress concentrations, with the accompanying trade-off that this increases material weight. Additional weight is generally detrimental for any gas turbine engine component, but additional weight has a pronounced effect with respect to rotating components (such as turbine blades), owing to centripetal loading. Hole reinforcement may also be provided in dependence on other local properties of the component, for example where there is a relatively thin underlying web thickness (e.g. a web thickness which varies along the first direction), then hole reinforcement may be provided to compensate for the reduced underlying web thickness, even if the absolute local loading is not excessive (e.g. at a radially outer portion of a turbine blade). Further, hole reinforcement may be provided to avoid or offset stress concentrations or forming defects associated with other geometric parameter variations. For example, and as mentioned elsewhere herein, features such as small fillet radii (or small chamfer length), acute angles and/or relatively low web thickness may be associated with forming defects such as recrystallisation, a risk of which may be avoided by providing hole reinforcement.

In each of the example arrays 80, 90, 100, 110 discussed above with respect to FIGS. 8-11, five cooling holes are shown. However, it should be appreciated that a cooling array may have any suitable number of cooling holes greater than one, and they may be provided in any suitable arrangement (including in multiple rows or columns, in a staggered arrangement, in multiple branches or along curved lines, and/or with varying pitch between them).

While each of the example arrays 80, 90, 100, 110 discussed above with respect to FIGS. 8-11 incorporate a single geometric parameter which varies over the array, the disclosure envisages that any number of these and other geometric parameters may vary together in view of similar trade-offs. For example, in addition to hole shape there may be variation in any or all of edge fillet radius/edge chamfer length, aspect ratio, offset angle, and a relative thickness of a hole reinforcement feature.

The above discussion of FIG. 10 is on the basis that a non-zero offset angle may be optimal from a flow perspective for each hole in an array, such that each hole which is effectively deflected from the common non-zero offset angle represents a trade-off to local reduce stress concentrations. However, in other examples it may be that the locally optimal offset angle varies along the array, and variable offset angles are provided for this reason, rather than being driven by consideration of stress concentrations.

While the above examples generally refer to a trade-off in view of a loading distribution which the respective component is subject to (e.g. an increasing loading or stress distribution along the first direction d1), in other examples there may be variation of one or more geometric parameters in view of other phenomena. For example, even with a relatively even or constant loading distribution, it may be advantageous to vary one or more of the above geometric parameters to compensate for other local design considerations.

As one example, an optimal offset angle may vary along a component (e.g. along a first direction of the component), and an array of cooling holes may be provided where the offset angle varies along the array (e.g. between two holes or more), together with variation of another geometric parameter to locally compensate for an associated stress concentration effect (e.g. a stress concentration which would be elevated if only the offset angle were to vary). For example, for holes having a relatively higher offset angle, a hole reinforcement may be provided (e.g. a relative thickness of a hole reinforcement feature may be increased) to offset an increasing offset angle, an edge fillet radius may be reduced, and/or an aspect ratio may be modified to diverge from unity. A suitable modification and an amount of variation can be tested and determined by routine analysis techniques, such as finite element analysis for structural loads.

The present disclosure envisages that the example geometric parameters as described herein may vary within an array while remaining within respective ranges. For example, the aspect ratio of the cooling holes may be between 1 (1:1) and 5 (5:1). The hole edge fillet radius or chamfer size may be between 0% and 100% of a web thickness. The offset angle may be between 0° and 45°. The relative thickness of a hole reinforcement may be between 0% and 100% of the web thickness, and may be between 0% and 50% of the web thickness at each face of the web.

The provision of a regular array of cooling holes (e.g. having common geometric parameters which are described as varying herein) may be associated with design and manufacturing advantages, with the same or similar structural and flow assessments being made or assumed to hold for each cooling hole, during a design phase, and the same or similar core pedestals being used during manufacture.

Cooling arrays as envisaged in the present disclosure may be designed making use of structural, aerodynamic, and/or aero-structural analysis techniques and optimisation technology. For example, finite element analysis techniques (such as computational fluid dynamics, CFD, and structural finite element analysis, FAE) may be used to simulate a stress field (i.e. a stress distribution) in a component provided with an array of cooling holes, and to iteratively vary one or more of the geometric parameters described herein. For example, such an optimisation may be conducted to optimise flow distribution effects (e.g. local flow directions as varied by controlling an offset angle, and flow rate distribution as may be varied by other geometric controls, such as hole size), while maintaining peak stresses within a stress field within acceptable limits by control of hole shape and other geometric parameters (such as edge fillet radii/edge chamfer length, hole aspect ratio, and/or hole reinforcement features).

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A gas turbine engine component comprising: a web provided with an array of cooling holes distributed adjacent to each other with respect to a first direction, wherein the cooling holes have a cross-sectional shape that varies from one cooling hole in the array to another along the first direction; and wherein an edge fillet radius varies from one cooling hole in the array to another along the first direction.

2. The gas turbine engine component of claim 1, configured so that the first direction corresponds to a loading distribution of the component which increases along the first direction from a low loading position to a high loading position.

3. The gas turbine engine component of claim 1, wherein: the edge fillet radius decreases along the first direction.

4. The gas turbine engine component of claim 1, wherein the gas turbine engine component is a turbine blade configured to be rotatably mounted in a gas turbine engine to extend along a radial axis, and wherein the first direction is a radially inward direction.

5. The gas turbine engine component of claim 1, wherein the gas turbine engine component is a vane of a turbine stage, or a liner segment for a combustor.

6. The gas turbine engine component of claim 1, wherein the web forms an internal wall within the component.

7. The gas turbine engine component of claim 1, wherein the gas turbine engine component has an impingement cavity delimited by a wall of the component and the web, and the web is configured to convey a cooling flow through the array of cooling holes to impinge on the wall within the impingement cavity.

8. The gas turbine engine component of claim 1, wherein the gas turbine engine component has two cavities partitioned by the web.

9. The gas turbine engine component of claim 1, wherein the edge fillet radius monotonically increases or decreases along a series of at least three adjacent cooling holes within the array, wherein the cooling holes are adjacent to each other with respect to the first direction.

10. A gas turbine engine including a gas turbine engine component of claim 1.

11. An aircraft including the gas turbine engine of claim 10.

12. A gas turbine engine component comprising: a web provided with an array of cooling holes distributed adjacent to each other with respect to a first direction, wherein the cooling holes have a cross-sectional shape that varies from one cooling hole in the array to another along the first direction; and wherein an edge chamfer length on a face of the web varies from one cooling hole in the array to another along the first direction.

13. The gas turbine engine component of claim 12, wherein the edge chamfer length on the face of the web decreases along the first direction.

14. The gas turbine engine component of claim 12, wherein the gas turbine engine component is a turbine blade configured to be rotatably mounted in a gas turbine engine to extend along a radial axis, and wherein the first direction is a radially inward direction.

15. The gas turbine engine component of claim 12, wherein the gas turbine engine component is a vane of a turbine stage, or a liner segment for a combustor.

16. The gas turbine engine component of claim 12, wherein the web forms an internal wall within the component.

17. The gas turbine engine component of claim 12, wherein the gas turbine engine component has an impingement cavity delimited by wall of the component and the web, and the web is configured to convey a cooling flow through the array of cooling holes to impinge on the wall within the impingement cavity.

18. The gas turbine engine component of claim 12, wherein the gas turbine engine component has two cavities partitioned by the web.

19. The gas turbine engine component of claim 12, wherein the edge chamfer length on the face of the web monotonically increases or decreases along a series of at least three adjacent cooling holes within the array, wherein the cooling holes are adjacent to each other with respect to the first direction.

20. A gas turbine engine component comprising: a web provided with an array of cooling holes distributed adjacent to each other with respect to a first direction, wherein the cooling holes have a cross-sectional shape that varies from one cooling hole in the array to another along the first direction; wherein
- a relative thickness of any hole reinforcement features projecting from one or more respective faces of the web around the cooling hole, relative to a local web thickness varies from one cooling hole in the array to another along the first direction;
- an offset angle between a hole axis along which the cooling hole extends and a normal axis which is normal to a face of the web varies from one cooling hole in the array to another along the first direction; and
- wherein along the first direction, the relative thickness of any hole reinforcement features increases as the offset angle increases, or the relative thickness of any hole reinforcement features decreases as the offset angle decreases.

* * * * *